June 22, 1971 N. M. TERC 3,586,516
MEAT DEFROSTING APPARATUS
Filed April 18, 1969 2 Sheets-Sheet 1
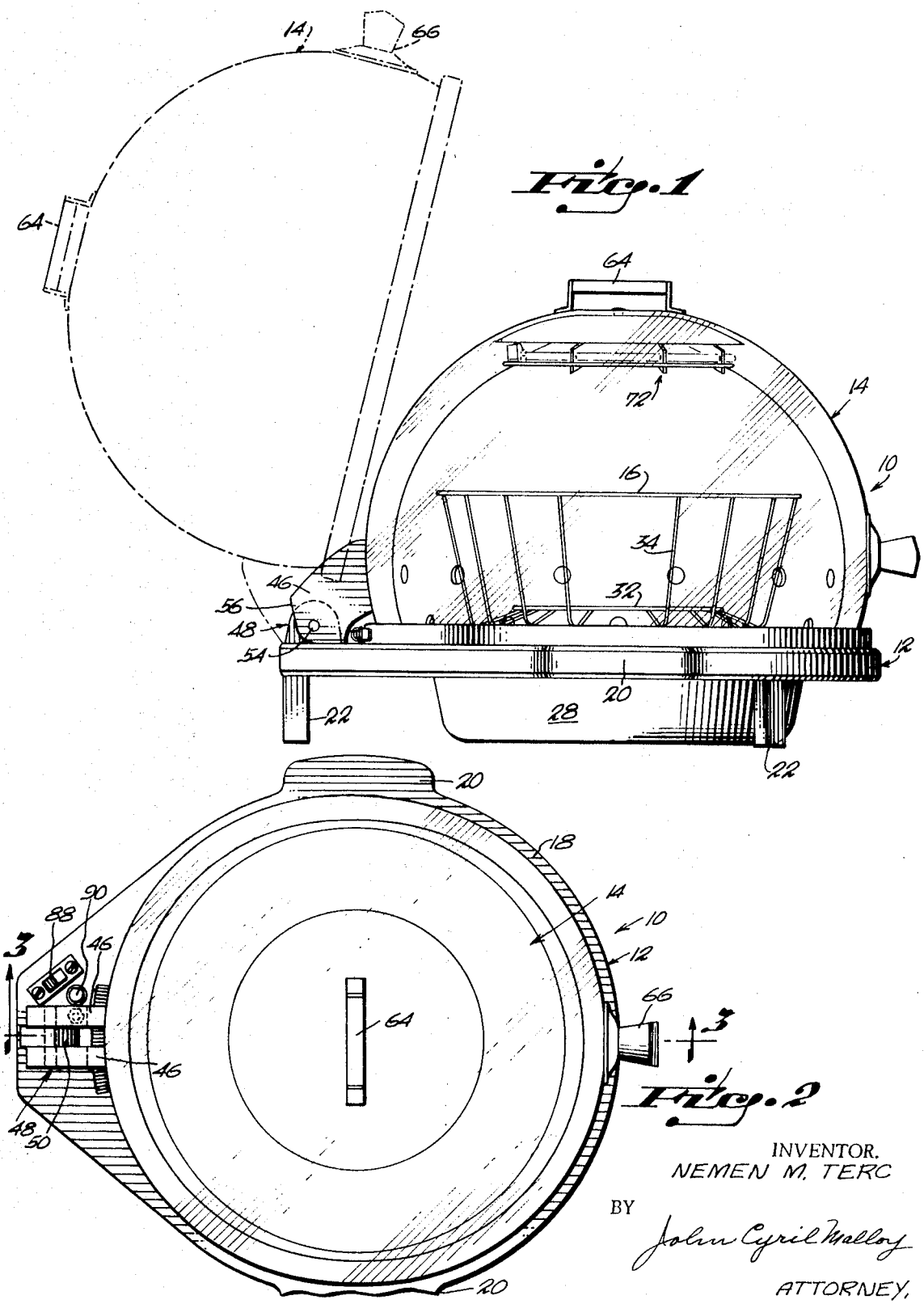
INVENTOR.
NEMEN M. TERC
BY
John Cyril Malloy
ATTORNEY.

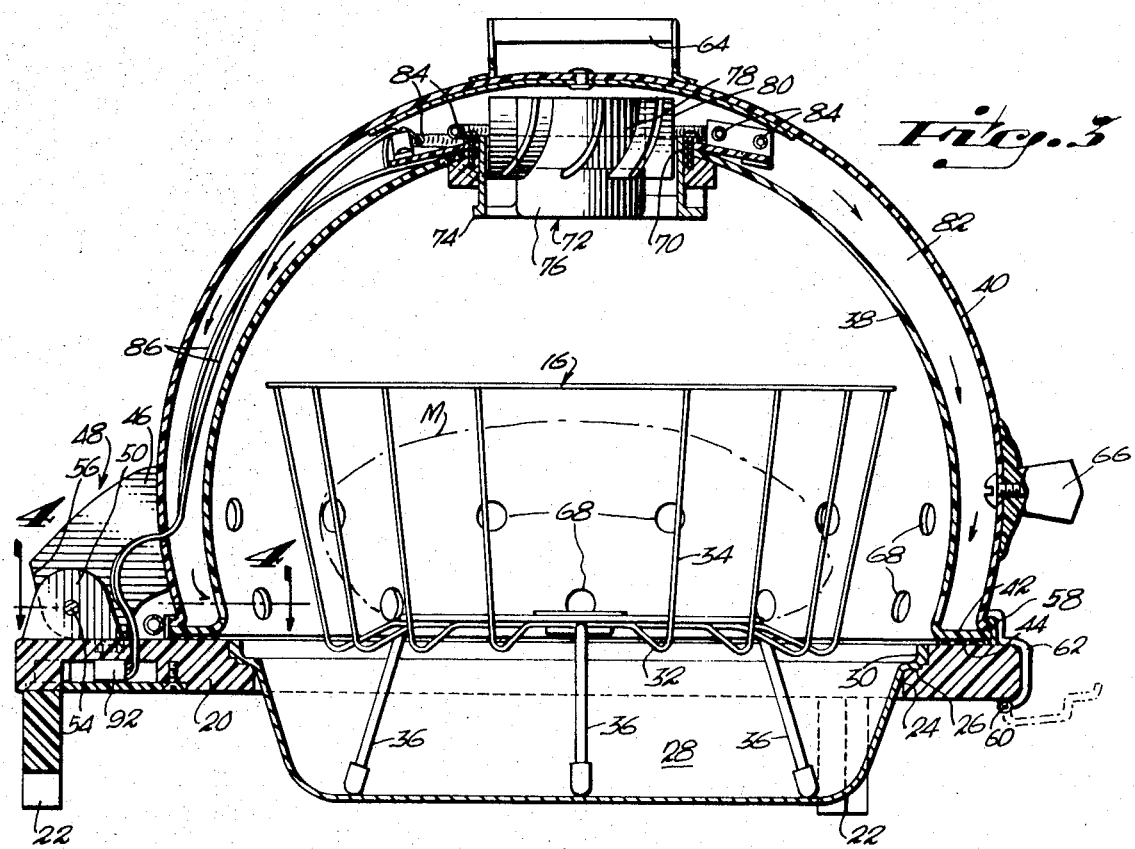
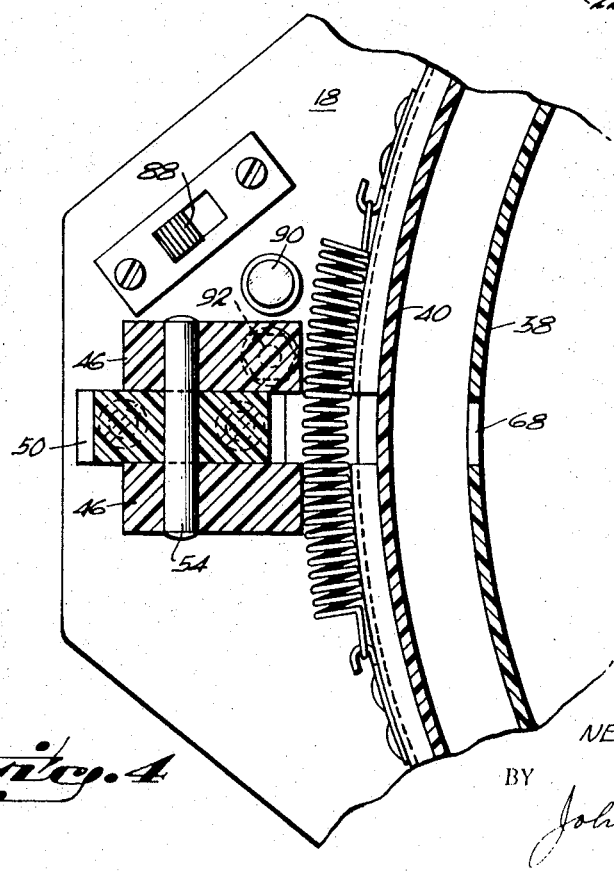

United States Patent Office 3,586,516
Patented June 22, 1971

3,586,516
MEAT DEFROSTING APPARATUS
Nemen M. Terc, Coral Gables, Fla., assignor to Fred C. Smith, Nassau, N.P. Bahamas, and John S. Joannou, Portsmouth, Anthony P. Kolantis, Norfolk, and Nicholas H. Themides, Virginia Beach, Va., fractional part interest to each
Filed Apr. 18, 1969, Ser. No. 817,354
Int. Cl. A23b 1/06
U.S. Cl. 99—234T                     4 Claims

ABSTRACT OF THE DISCLOSURE

Apparatus for defrosting frozen foods and particularly meats in which a closed receptacle includes an open, elevated-basket enclosed beneath a double-walled dome forming a plenum in which air outlets are circumferentially disposed about the basket and air is expressed toward the basket and is exhausted axially above the basket in a continuous path of movement while being heated whereby frozen meats and the like are maintained in a substantially moist condition, natural flavor is retained, defrosting is accelerated, and the exposure to active bacteria in the air is maintained at a minimum while the meat is being defrosted.

---

This invention relates generally to apparatus for defrosting frozen foods and particularly meat.

In the past, the housewife when defrosting meat, would place the meat in the refrigerator after removing it from the freezing compartment, would place the meat in the oven, or on the sink, and some women have been known to run hot water over the frozen meat. This latter means of defrosting is unsatisfactory, and apparently ruins the the texture of the meat, and the former prior methods of defrosting are extremely time consuming. Additionally, if the housewife places the frozen meat on the counter of the sink or in the oven, and inadvertently neglects to place the meat in a refrigerator after it has been thawed, the meat although perhaps not spoiling, may take on a disagreeable odor which is unappetizing to say the least.

Primary objects of the present invention are: to provide means for accelerating defrosting of frozen meat while preventing prolonged exposure of the meat at room temperature to the atmosphere, and retaining natural fresh flavor of the meat and also retaining residual moisture in the meat; to provide novel defrosting apparatus in which a housing includes a novel means including a basket in which frozen meat or the like is supported in an elevated position and in which a double-walled dome or closure member incorporates a plenum chamber including lower peripheral outlets for directing streams of heated air in a predetermined pattern of flow beneath the basket and the dome incorporates an upper blower-and-heating means through which the air passes whereby heated air is maintained above normal room temperature but substantially below cooking temperatures and is constantly circulated in a plenum and path passing from beneath the frozen meat about the sides and axially thereabove; to provide novel defrosting apparatus in which a removable well member cooperates with an elevated basket means for readily permitting the circulation of defrosting air and serves to catch fluids dropping off the food as it is defrosted, and further permitting the apparatus to be readily cleaned.

These together with other and more specific objects and advantages of the invention will become apparent from a consideration of the following description of an exemplary embodiment when taken in conjunction with the drawing forming a part thereof in which:

IN THE DRAWING

FIG. 1 is a side elevational view of a defrosting apparatus illustrating the invention, and showing by means of phantom lines the apparatus in a "open" condition;

FIG. 2 is a top plan view of FIG. 1;

FIG. 3 is an enlarged vertical section taken substantially on the plane of line 3—3 of FIG. 2; and FIG. 4 is a further enlarged, fragmentary plan view taken substantially on the plane of line 4—4 of FIG. 3.

Referring to the drawing in detail, a housing is indicated generally at 10 and comprises a base member 12, a closure member 14, and basket means indicated generally at 16.

The base member 12 comprises a substantially flat collar 18 produced from any suitable heat insulating material, for example, and incorporating diametrically opposed handle portion 20. The collar member 18 incorporates equidistantly spaced, integral support legs 22 and has a central aperture 24 surrounded by an upper undercut ledge portion 26. Removably received in the aperture 24 is a readily washable receptacle or well 28 having an upper peripheral collar or margin 30 complementary to the ledge portion 24. The receptacle 28 is preferably produced from a metal such as stainless steel or the like.

Basket means 16 is generally circular, in its preferred form, produced from suitably welded wire elements forming both an open bottom and open sidewalls respectively indicated at 32 and 34, and depending from the bottom wall 34 are circumferentially spaced support legs 36. As will be observed in FIG. 3, the legs 36 support the bottom wall 32 of the basket means a considerable distance above the bottom of the receptacle 28 to permit ready and rapid air circulation therebeneath. A piece of frozen meat M, i.e. beef, fowl or fish as indicated by phantom lines in FIG. 3, will be disposed within the basket means 16 and the general path of air circulation as illustrated by the arrows applied in FIG. 3.

The closure member 14 comprises a double-walled dome including a substantially semi-spherical inner wall 38 in parallel relationship to a semi-spherical outer wall 40, the walls being integrally connected at their lower periphery by a transverse sealing wall 42. The wall 42 will engage the upper surface of the collar 18, and, if preferred, may have incorporated thereon an integral, suitably secured sealing gasket 44. On the other hand, the sealing gasket 44 could be secured to the upper surface of the collar 18 and, of course, would be complementary to the lower surface of the transverse wall 42.

Integral with the outer wall 40 and extending laterally or radially from one side thereof are a pair of spaced hinge elements 46; see FIG. 2, forming part of a hinge assembly indicated generally at 48; elements 46 flanking a vertically extending element 50 integral with the collar 18. A transverse pivot pin 54 extends through aligned transverse apertures in elements 46 and 50; see FIG. 4, and the elements 46 include a rear abutment shoulder 56 which will engage the upper surface of the collar 18 to orient the cover 14 in the dotted line "open" position shown by phantom lines in FIG. 1.

The outer wall 40 and lower transverse wall 42 include an annular peripheral flange portion 58, and hingedly connected at 60 to the under surface of the collar 18; see FIG. 3, is a clip or latch element 62 which will releasably clamp the closure member 14 onto the base member 12. To facilitate transport of the apparatus, a suitable handle assembly 64, is suitably secured on the upper surface of the outer wall 40 of the closure member.

Additionally, to facilitate "opening" of the closure member 14, a forwardly projecting handle or knob 66 is suitably secured to the front wall 40 diametrically opposite the hinge assembly 48.

The inner wall 38 includes a plurality of circumferentially spaced air-outlet apertures 68, the lowermost apertures being generally in co-planar relationship with the bottom wall 32 of the basket 16. Extending axially through an upper axial aperture 70 of the inner wall 38 is a combined feeder-and-blower assembly indicated generally at 72. The assembly 72 comprises a generally annular support collar 74 in which is disposed a suitably rated electrical motor 76. The power shaft of the motor 76 (not shown) has fixed thereto an annular, axial fan blade 78 including a plurality of axially extending, arcuate fan blades 80 which will function to draw air axially from above the basket 16 i.e. away from the meat and circumferentially discharge air, under pressure, through a passage 82 formed by the respective inner and outer walls 38 and 40. Circumposed about the fan blades 80 in spaced relation therefrom, are annular, resistance-heater elements 84 which will intersect the air in its path of movement indicated by the direction arrows. The motor 76 and resistance heater elements 84 are suitably insulated from the walls and are operatively connected by suitable conductors 86 to a source of current (not shown) controlled by a control switch 88. Incorporated in the circuit (not shown) is a signal light 90 and a control switch 92; see FIG. 4. The control switch 92 (engaged by one hinge element 46), will open the circuit to the heating elements and motor when the closure member 14 is in the phantom line position in FIG. 1. Additionally, and although not shown in detail, the circuit to the heater elements 84 will incorporate a thermostatic control which will maintain the temperature within the housing member 14 at a range above normal room temperature i.e. above 70 to 74 degrees F. but below a temperature which might cause the food being defrosted to be inadvertently cooked.

Further, if desired, the circuit to the heaters 84 and motor 76 can incorporate a timer causing current flow to these components to be cut off at a predetermined time interval.

Briefly, a piece of meat, fish or fowl is placed in the basket means 16 and the control switch 88 is operated after the closure member 14 is closed; heated air is circulated in the plenum or passage 82 and is expressed about and beneath the meat since the basket means is a relatively open framework. As the ambient air temperature increases around the meat which was frozen, the treated air rises, and is withdrawn from about the meat and basket means by the fan blades 80, the air then being discharged past the heated resistance coils 84 and then out of the apertures 68 as previously mentioned.

Contrary to the procedure of permitting meat, fish and fowl to defrost at room temperatures in the oven, for example, or in a refrigerator, the present system maintains the heated air within the plenum 82 thus obviating inadvertent cooking of the food being defrosted. Additionally, as the air is heated it moves past the heating coils 84 and any bacteria entrained in the air is killed or substantially reduced and eliminated. Still further, the natural odor of the fresh meat and natural juices of the food being defrosted are retained within the housing.

Retention of moisture in the food is quite important, since in conventional cooking, it is important that food being cooked be cooked in its own juices i.e. when broiling a steak it is important to rapidly produce a crust on the outer surface of the steak wherein the natural juices are retained within the steak as it is being raised to cooking temperature.

Contrary to the danger of inadvertently forgetting to place defrosted food back into a refrigerator, or failing to place frozen foods in a refrigerator early enough to obtain adequate defrosting, before cooking, the present apparatus permits substantially immediate defrosting of the frozen food, reduction of exposure to bacteria in the air as well as actual destruction of bacteria as the air is being heated and circulated. The plenum 82 prevents air, after it is immediately heated, from coming into contact with the food. On the contrary, the heated air is conditioned as it passes through the chamber whereafter it is expressed around and below the frozen food to obtain natural circulation as the food is being defrosted.

Even if, frozen food were placed in a basket means comparable to that shown at 16 in this application, without the present apparatus, a stagnant cold air pocket would soon develop beneath the basket means and thus proper defrosting could not be accomplished unless the housewife remembered to invert the frozen food. Additionally, certain foods are extremely perishable i.e. Blue fish for example. Thus, if Blue fish are permitted to thaw in the atmosphere, before the inside of a frozen fish is thawed, danger of outer surface spoilage can exist.

What is claimed is:

1. Apparatus for defrosting frozen food comprising a housing including, in combination:
    a dish-like base member;
    basket means adapted to hold food items supported by said base member;
    a closure member comprising plenum means displaceably supported by said base member and circumposed about said basket means, said closure member comprising said plenum means being substantially dome-shaped and having inner and outer walls extending from the lower portion thereof substantially upwardly and then substantially inwardly, said inner wall including a plurality of lower air outlet apertures generally directed towards a bottom wall of said basket means, said inner wall further including an upper air inlet aperture disposed substantially centrally above said basket means and above said plurality of lower air outlet apertures, said closure member carrying heater-and-blower means interposed between said lower air outlet apertures and said upper air inlet aperture and communicating with said plenum means whereby heated air is continuously circulated through said plenum means between said inner and outer walls and about said basket means within said housing, said heater-and-blower means being axially disposed at and above said air inlet aperture beneath said outer wall of said closure member and including a motor-driven annular fan blade having an axial inlet and a circumferential outlet communicating with said plenum means as well as electrical heater elements circumposed about said fan blade downstream of the outlet therefor and between said inner and outer walls whereby air passing thereover is heated and bacteria contained in said air is substantially reduced;
    a hinge assembly interconnecting said base member and said closure member, said hinge assembly permitting said closure member to be swingably moved with respect to said base member between a closed position and an open position and having an abutment portion for orienting the lower portion of said closure member at substantially 90 degrees with respect to said base member when said closure member is moved to said open position; and
    a control switch for opening the electrical circuit to the heater elements and the motor.

2. The structure claimed in claim 1 in which the base member comprises a removable well member, said basket means comprises an open framework including foot elements depending into said well member.

3. The structure claimed in claim 2 in which said base member comprises a collar supported in an elevated position by depending foot elements, said well member including a bottom portion depending through said collar.

4. The structure claimed in claim 1 in which said basket means comprises a framework forming bottom and sidewalls, and a plurality of feet depending from said bottom wall and supporting said bottom wall at a substantially elevated position.

(References on following page)

References Cited

UNITED STATES PATENTS

| | | | |
|---|---|---|---|
| 2,523,796 | 9/1960 | Weeks | 219—400 |
| 2,560,808 | 7/1951 | Maccallum | 34—53 |
| 2,966,573 | 12/1960 | Hansen | 126—21X |
| 3,347,618 | 10/1967 | McKeown | 219—439X |
| 3,368,062 | 2/1968 | Gramenius et al. | 219—400 |

FOREIGN PATENTS

| | | | |
|---|---|---|---|
| 621,155 | 4/1949 | Great Britain | 99—338 |

VOLODYMYR Y. MAYEWSKY, Primary Examiner

U.S. CL. X.R.

34—196, 197, 225; 99—337, 447; 219—400, 430, 439